United States Patent
Malek et al.

[15] 3,672,261
[45] June 27, 1972

[54] APPARATUS FOR REMOVING FOAM BODIES FROM MOLDS

[72] Inventors: Jack H. Malek, Palos Verdes Peninsula; Trevor Dawson, Hermosa Beach, both of Calif.

[73] Assignee: Mattel, Inc., Hawthorne, Calif.

[22] Filed: Nov. 26, 1969

[21] Appl. No.: 880,315

[52] U.S. Cl..................................92/137, 74/527, 264/335
[51] Int. Cl..........................................................F01b 9/00
[58] Field of Search.....................92/29, 30, 14, 15, 18, 19, 92/23, 25, 24, 164; 74/527, 529; 188/67; 264/334, 335

[56] References Cited

UNITED STATES PATENTS

| | | | |
|---|---|---|---|
| 451,846 | 5/1891 | Bachman | 92/29 X |
| 2,245,786 | 6/1941 | Johnson et al. | 92/19 X |
| 2,333,274 | 11/1943 | Scannell | 92/14 |
| 2,786,450 | 3/1957 | Jacobus et al. | 92/30 |
| 2,809,721 | 10/1957 | Knights | 188/67 |
| 2,917,277 | 12/1959 | Pine | 92/19 |
| 3,177,780 | 4/1965 | Andersen et al. | 92/21 X |
| 3,320,861 | 5/1967 | Johnson et al. | 92/29 X |
| 3,136,225 | 6/1964 | Rader | 92/164 |

Primary Examiner—Martin P. Schwadron
Assistant Examiner—Leslie J. Payne
Attorney—Seymour A. Scholnick

[57] ABSTRACT

A device and method for removing foam bodies from molds which comprises an air cylinder for attachment to the mold, the air cylinder having a slidable piston therein, and clamp means associated with the piston for affixing to a portion of the mold or molded body to pull the body from the mold into the cylinder. Means is provided for communicating an inner cavity of the molded body with atmospheric pressure or vacuum, and means is provided for admitting pressurized gas to the mold to compress the foam body therein, facilitating withdrawal.

9 Claims, 5 Drawing Figures

INVENTORS
JACK H. MALEK
TREVOR DAWSON

INVENTORS
JACK H. MALEK
TREVOR DAWSON
BY
ATTORNEY

APPARATUS FOR REMOVING FOAM BODIES FROM MOLDS

The herein invention is particularly based upon the principle disclosed in co-pending application, Ser. No. 786,231, filed Dec. 23, 1968, assigned to the same assignee. In the co-pending application, there is disclosed a novel method for removal of foam bodies from molds. As pointed out in that case, prior to the invention there was not a successful method available for removing solid foam bodies from continuous solid molds so that the resulting product was virtually seamless. The prior invention comprised the use of external gaseous pressure admitted to an opening in the mold. The pressure served to compact the foamed body and allow for its withdrawal into a pressure chamber. Upon release of the pressure, the body would expand to its original shape as formed in the mold. As pointed out, that invention was based upon the utilization of closed cell foamed structures, which allow for such action to be effected by gaseous pressure. Additionally, as pointed out in the prior application, that invention was particularly useful for solid foamed bodies; in other words, bodies where the foam extended throughout the mold. However, that invention related additionally to any closed cell foam body, regardless of whether or not the foam entirely occupied the mold. Further, as disclosed in the prior case, the foam body was removed by a rod or other means extending into the body, which served to pull it when compacted from the form mold.

Though the previously disclosed technique in the prior filed application is most satisfactory, it has been found that the process can be improved, particularly in hollow foamed bodies or bodies having a small center cavity therein, by the use of the herein to be described invention. Additionally, the prior method is improved hereby through providing a more positive and effective means for withdrawing the compressed foam body from its mold. Another advantage of the instant invention is the ability to provide a simplified and expeditious means for readily removing the foam body from its mold.

Briefly, the herein invention is particularly useful in the removal of foamed bodies having at least a small cavity therein. Such foamed bodies are normally formed with an outer skin, as for example disclosed in Patent application, Ser. No. 792,921, filed Jan. 22, 1969 and assigned to the same assignee. The present invention is further particularly useful where the foam bodies comprise a doll or other similar shaped body. In accord with the herein invention, the mold for forming the foamed body is provided with a separable end cap against which the outer skin is concurrently formed during the formation of the skin throughout the entire mold. The end cap in a preferred embodiment of the invention is located above the head of a doll or like body and in effect provides an elongated extension from the top or head of the doll. In performing the method of the present invention a pressure vessel which may preferably be an air cylinder is affixed in a sealed relationship to the top end of a mold body. A slidable piston is located within the air cylinder so attached. Extending through the air cylinder is an outlet line which can communicate with a cavity located within the molded body to allow the escape of entrapped gas during the compression of the body. In a first embodiment of the invention, a clamp means is affixed to the slidable piston and grips the end removable cap. When air pressure is admitted to the cylinder, between the end of the piston and the top of the mold, the piston is driven away from the mold, serving initially to separate slightly the end cap from the main mold body and allow the gas to enter the mold and compact or compress the foamed product. After the body is compressed further movement of the piston away from the body pulls it out of the mold into the air cylinder. The mold is then detached from the air cylinder and the compacted body can be pulled therefrom.

In a second embodiment of the invention, the end cap used is removed prior to connecting the body to the air cylinder. A clamp means then is directly affixed to the foam skin exposed at the portion formerly covered by the end cap. Additionally, a further embodiment of the invention involves the use of a perforated tube which can extend into the center cavity of the formed body to allow and facilitate the escape of trapped air or gas during the compression step of the method.

It is believed that the invention will be further understood from the following detailed description and drawing in which.

Figure 1:
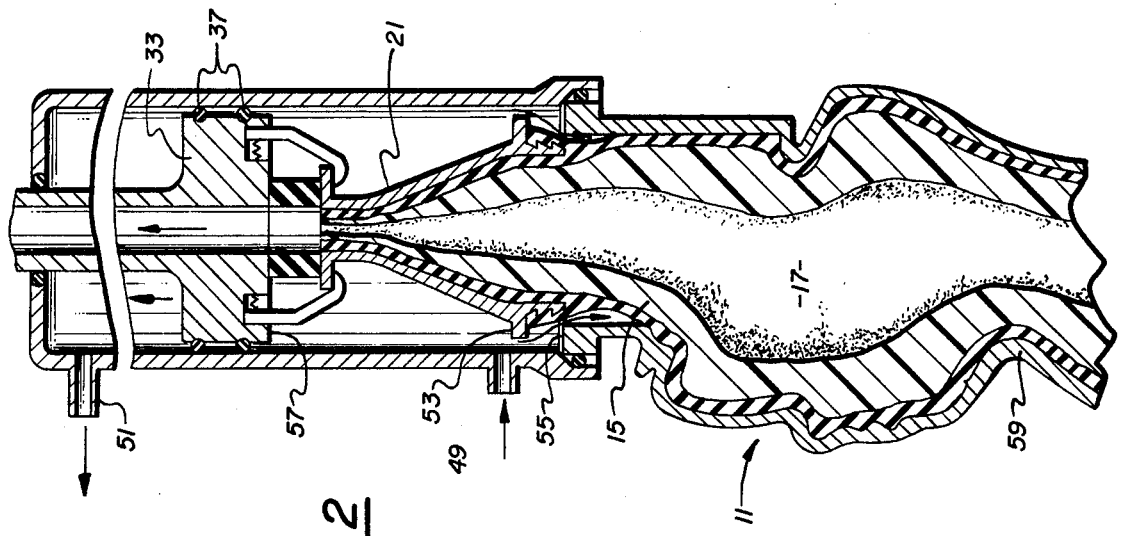
FIG. 1 is a cross-sectional plan view of the device of this invention affixed to a doll mold in the initial position.

Turning now to FIG. 1 there is seen a top portion 11 of a doll mold, having the head of the doll formed thereon. Within the mold 11 is seen the foamed doll which comprises an outer skin 13 and an inner foamed layer 15 which can be formed from compositions utilizing the method disclosed in patent application, Ser. No. 792,921, filed Jan. 22, 1969. As can be seen, the foamed resin material 15 does not fully occupy the mold but rather leaves a void center area 17. The mold 11 has, as indicated, a contour according to a face or head of a doll body. The remaining portion of the doll body is not shown. In the particular embodiment shown by way of example in these drawings, the head portion terminates essentially along line A—A. This allows for a separate piece to be attached to the doll head which serves as the scalp and will contain the hair for the doll.

Extending from the doll body above the termination of the head portion indicated by line A—A is an extension 19. Extension 19 which is integrally formed with the mold 11 is generally a cylindrically shaped portion which will have an outer diameter sufficient to allow the doll body to be withdrawn from the mold in accord with the method of the invention. Seated in the top end of the extension 19 of the mold 11 is a mold cap 21 which is shown in this embodiment as being fructroconical in configuration. The mold cap has a serrated base portion 23 about which the skin 13 is formed and adheres during the formation of the body in the mold. Thus, the serrated portion 23 effectively serves to lock and seal the mold cap to mold 11. The end cap 21 further has a flat radially extending flange 25 above its serrated portion 23 so that the cap can rest on the extension 19. A second radial flange 26 is provided at the top of the cap.

To initially form the doll in accord with this invention, the mold 11 together with the mold cap 21 can be fully filled with the material to be foamed. Then utilizing slush molding techniques, the foamed body is formed within the mold as shown in the Figure. As can be seen, since the mold cap is affixed to the mold, the skin portion 13 together with the main foam body 15 will extend continuously from the mold 11 up to and through the mold cap 21 in a continuous line. If rotocasting techniques are used to form the foam body, then the top flanged end 26 of the cap would, of course, be closed off during the rotocasting. As can thus be seen, the resulting molded product has a significant additional top portion corresponding to the area of the mold extension 19 and mold cap 21, which extends beyond the main body of the doll. It is to be noted that in slush molding techniques, no skin generally will form across the flanged top 26 of the end cap, since this is generally above the heated bath or just at the level of the top of the heated bath. This leaves an opening 28 which communicates with the inner cavity 17. In rotocasting, however, a slight skin would form across the opening. This skin preferably would then be broken prior to performing the withdrawal method of this invention to allow the continuous passage through to the cavity 17, as is seen in the Figure.

After the doll has been formed in the mold, it is then ready for extraction by attachment to a device of this invention. An air cylinder or pressure vessel 27 is provided which has a diameter preferably no less than the diameter of the smallest portion of the mold. In the case of a doll, this would be in the neck portion. The upper extension portion 19 of the mold is seated within the bottom open end 29 of the air cylinder, and is separated therefrom by an O-ring seal 31. The air cylinder extends from the open end 29 to a closed upper end 30 for a length sufficient to pull the formed body from its mold into the cylinder.

Disposed within the air cylinder 27 is a slidable piston 33 having a hollow piston rod 35 affixed thereto. O-ring seals 37 separate the outer periphery of the piston element 33 from the cylinder 27 and prevent gas from escaping around the piston. Additional O-ring seals 38 seal the piston rod relative to the top of the cylinder where it passes therethrough. Affixed to the bottom end of the piston 33 are a plurality of clamp elements 39, two shown by way of example. The clamp elements are spring loaded by springs 41 embedded in recesses 43 formed in the piston 33. The spring loading allows the clamped elements 39 to separate when the mold is affixed to the air cylinder, such that the flange portion 25 of the end cap will separate the clamps and allow them to grip a bottom surface 45 of the flange portion in a manner shown in the Figure. Additionally, affixed to the piston 37 by adhesive or other means is a cylindrical elastomeric gasket element 47. Gasket 47 serves to seal the end cap 21 relative to the piston 33. As can be appreciated the tendency of the clamps 39 is to pull the end cap upwardly toward the piston, thus providing a compression force on the gasket 47 providing the desired gas tight seal therebetween.

Air cylinder 27 is additionally provided with an inlet 49 which is disposed adjacent the bottom end of the cylinder such that the inlet is intermediate to the end of the cylinder and the piston element 33 when the end cap 21 is fully inserted into the air cylinder. Once the doll is in the position shown in FIG. 1, air at a pressure on the order of 30 psi is admitted through the inlet 49. Disposed adjacent or near the top of the air cylinder 27 is a second upper inlet 51. As can be appreciated, one can thus control the movement of the piston 33 by the differential pressure exerted on each side thereof, as determined by the air pressure admitted through inlets 49 and 41.

Figure 2:
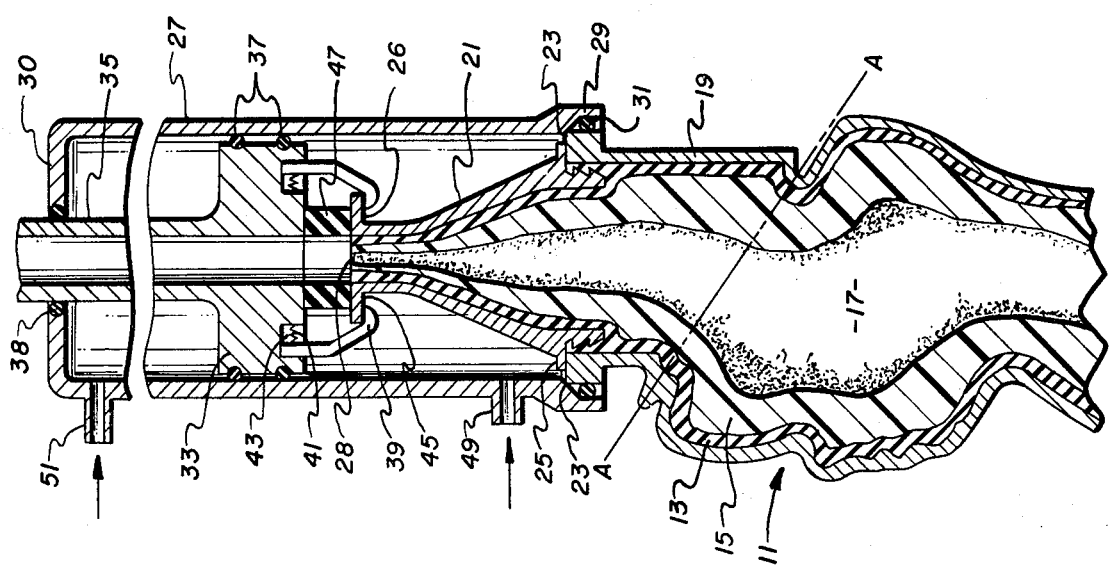
FIG. 2 is a cross-sectional view of the device of FIG. 1 as shown in the position of extraction of the formed foam body from the mold.

In performing the process of this invention, the pressure through inlets 49 and 51 is initially equal when the mold and formed doll are in the position shown in FIG. 1. To remove the formed body, the piston 33 is first moved slightly upwardly away from the doll body, pulling the end cap 21 upwardly therewith, as seen in FIG. 2. This causes a separation between a flange portion 53 on the end cap and the corresponding seat 55 on the main mold portion. The small upward movement of the piston 33 can be caused by slightly decreasing the air pressure in inlet 51 so that there is greater pressure temporarily on a bottom surface 57 of the piston 33. The pressure then is stabilized again on both sides so that the piston will not move upward any further after an initial slight separation occurs between the end cap 21 and the mold, as indicated. At this point, the air from inlet 49 enters, as shown by the arrow, the main mold 11, forcing the foamed body 15 away from the walls to compact the body in a manner described in the previously filed application, Ser. No. 786,231, filed Dec. 23, 1968, assigned to the same assignee. Simultaneously with the compaction, air or gas entrapped within the mold and the center hollow portion 17 is allowed to escape through the hollow piston and rod elements.

After the doll has been compressed or shrunk due to the air pressure to a point where it can be pulled through the narrowest portion of a mold, for example at the neck portion 59 of a molded doll body, the foamed product is then ready for removal from the mold. This can be accomplished by then reducing the air pressure through inlet 51 so as to cause a differential pressure across the piston element 33, with the greater pressure on the bottom surface 57 tending to drive the piston upwardly pulling the doll from the mold. The doll body remains affixed to the end cap 21 through its attachment at the serrated portion 23. For example, to pull a foamed doll from a mold it has been found that approximately 30 to 35 pounds of force is required. Thus, if the air cylinder has an inner diameter of approximately 6 inches, a differential pressure across the piston 33 of 1 to 2 psi will be sufficient to pull the compressed doll from the mold. Thus, if the air pressure through inlet 49 is 30 psi, the pressure through line 51 on the opposite side of the piston would be maintained at 28 psi. The molded body is then pulled upwardly to the point where all of the formed body is pulled past the narrowest portion of the mold. In the example shown, this would mean that the feet of the doll would be pulled through the neck portion 59. At this point the movement of the piston is stopped by stopping the air flow through the inlets 49 and 51. Alternatively, of course, the entire body can be within the air cylinder 21 if the piston is pulled upwardly sufficiently to pull the entire body into the air cylinder. After the body has been withdrawn from the mold it remains affixed to the mold cap 21. One then merely grabs the exposed end of the molded product at the bottom of the air cylinder and pulls downwardly, pulling the body out of the cylinder to the point where the end cap 21 is exposed at the clamps 39. The end cap is then detached from the clamps 25 and will remain fixed to the foam doll product. Alternatively, the body can be pushed out by increasing the pressure through inlet 51 to drive the piston downward.

It is preferred to cut the exposed doll body from the end cap 21 without pulling the portion of the body away from the cap. Generally the body can be cut along line A—A which will form, as has been previously indicated, the hair line. A separate previously formed piece may then be affixed to form the scalp and contain the hair for the doll. The remaining foam portion in the mold cap 21 is then peeled away from the walls thereof so that the cap is suitable for use in subsequent operations.

Figure 3:
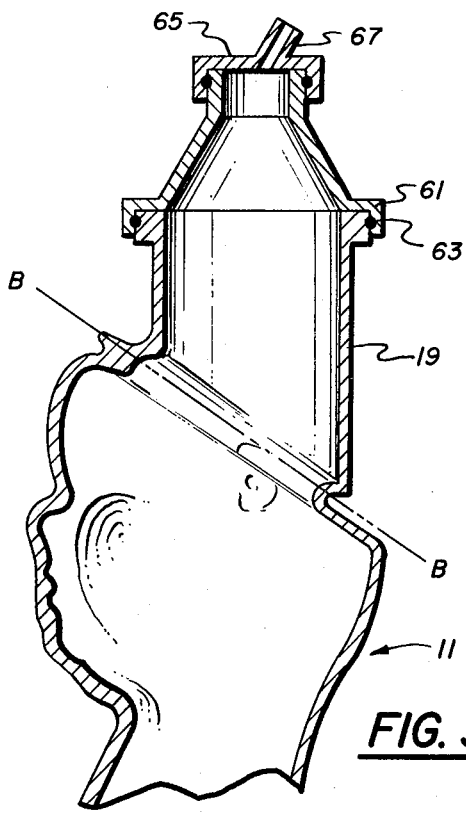
FIG. 3 is a cross-sectional plan view of a mold of this invention prior to being filled with foamable composition.

The prior discussion with regard to the first embodiment of the invention, as has been described, involves pulling the formed body from the mold by the use of a separate end cap to which clamps are attached. One of the features of the second embodiment to be described involves the elimination of the end cap during the removal of the foam body, such that a clamp can be directly attached to the foam. Turning now to FIG. 3, there is seen the same doll mold 11 as shown in FIGS. 1 and 2. However, affixed to the top extension 19 is a different type of end cap 61, which is sealed to the extension portion 19 by O-ring seal 63. The end cap 61 may have a further cap 65 covering its top which cap 65 has an inlet line 67. The top cap 65 is particularly used when the foaming in the doll is done under pressure. The inlet line 67 serves to control the pressure. The use of pressure in forming foamed products is described for example in previously filed patent application, Ser. No. 635,538, filed May 2, 1967, assigned to the same assignee. It should be pointed out that the same type of a top cap 65 can be utilized with regard to the embodiment shown in FIGS. 1 and 2, as well.

Figure 4:
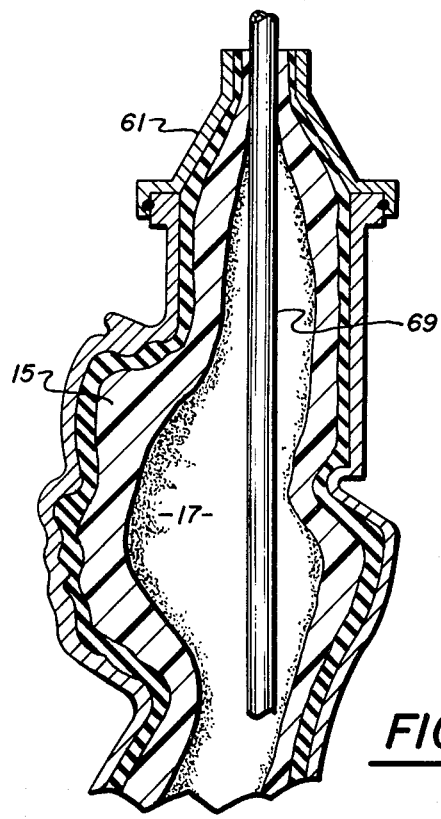
FIG. 4 is a cross-sectional plan view of the mold of FIG. 3, showing the insertion of a probe for allowing gases within the formed doll to escape during withdrawal of the body from the mold.

After the plastisol has been placed in the mold and expanded to form the doll 15, the top pressure cap 65 is removed as seen in FIG. 4, and a probe 69 is inserted into the doll body. Probe 69 can extend into a formed cavity 17 which might normally exist if the doll is not completely formed within the mold. Alternatively, the probe 69 will provide a cavity within the doll if none exists. Probe 69 can serve two functions. The first function is to admit circulating cool air into the doll body during the cooling step in formation of the formed body. Secondly the probe allows any entrapped air or gas to escape from the center cavity during the compaction process used during the removal of the formed body from the mold. The probe 69 can be open at its terminus within the formed body, or alternatively, be a perforated tube. After the formed foam body 15 is completely cooled, the mold cap 61 is then removed and the body is ready for extraction.

Figure 5:
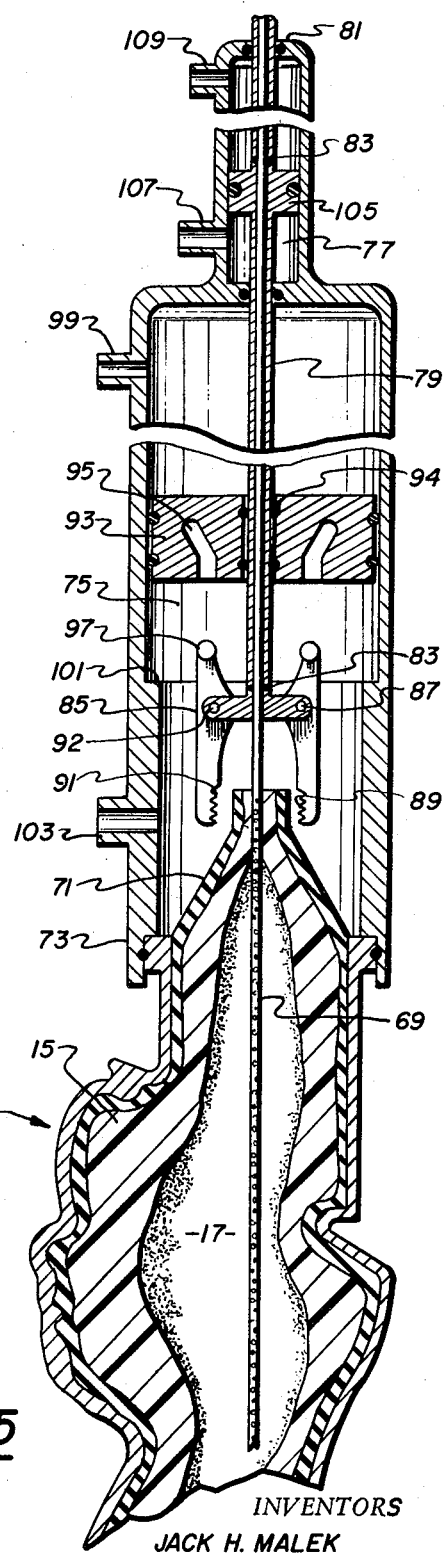
FIG. 5 is a cross-sectional plan view of the mold of FIG. 4 affixed to a device of this invention which serves to withdraw the formed foamed product from the mold.

Turning to FIG. 5, there is seen a second embodiment of an air cylinder arrangement for removal of a foamed body formed in accord with the description in FIGS. 3 and 4. As can be seen, after the end cap 61 is removed by merely lifting it from the top of the main mold 11, the foam portion 71 under the mold cap is exposed. The mold is then affixed to an air cylinder 73 with the exposed portion 71 extending therein. The air cylinder 73 has a main chamber 75 in which the end portion 71 of the body extends, and a second separate enclosed chamber 77 at the top thereof. As can be seen, probe 69 extends through both chambers 75 and 77 venting to the atmosphere, or alternatively to be connected to a cooling air source if such is used prior to withdrawal.

Disposed within the air cylinder 73 concentrically about the perforated tube 69 is a slidable tubular piston rod 79 which, together with the perforated tube 69, extends from the air cylinder 73 out through the top end 81 thereof. The tubular piston rod 79 is sealed relative to the piston 93 by O-ring seals 94, and to the perforated tube 69 by O-ring seals 83. Disposed at the bottom end of the piston rod, within the air cylinder 73, are movable clamps 85 connected thereto by pivot points 87. When the doll mold is inserted into the air cylinder, the exposed portion 71 which extends into the mold will have its uppermost portion 89 located between the serrated edges 91 of the clamps, but will not be in contact therewith. Disposed in the cavity 75 above the clamps 85 is a freely slidable piston element 93, having slots 95 formed therein which can engage the upper portion 97 of the clamps 85 in a manner to be described.

To cause the clamps 85 to engage the upper portion 89 of the foamed product, air or other gas is admitted through inlet 99 near the top of the cavity 75, thus driving the piston 93 downwardly such that the slots 95 engage the portions 97 of the clamps. The slots 95 as can be seen are canted outwardly from the piston rod 79 so as to cause the serrated ends 91 of the clamps to move inwardly about pivots 92 and tightly grasp the adjacent portion 89 of the foam product. Preferably, the air cylinder is provided with a reduced inner diameter at 101 which serves as a ledge to prevent the slidable piston 93 from moving downwardly too far in the air cylinder and tending to push the doll out of the device. In other words, the reduced diameter or ledge 101 provides a stop for the piston, allowing it to properly engage the clamp 85 causing it to grip the foamed product. The clamp 85 is so shaped that when clamped, it will create a tight air seal around tube 69 and permit the air to exhaust to the atmosphere thru this tube when the doll is collapsed.

After piston 93 has been moved down to ledge 101, gas or air is admitted through inlet 103 adjacent the bottom of the air cylinder. This is to collapse the doll in the manner previously described. As can be appreciated, in this embodiment of this invention, the air or gas admitted through inlet 103 will immediately act upon the exposed surface 71 without having to force an additional separation as disclosed in the previous version shown in FIGS. 1 and 2. The exposed surface 71 thus provides an immediate large area upon which the gas acts to start the compression process. During this step, when the product is fully compressed, the pressure maintained through inlet 99 on the opposite side of slidable piston 93 is equalized to the pressure through inlet 103 so that the piston 93 does not tend to move either upwardly or downwardly during the compaction.

With the doll fully compacted and the air pressure equalized on both sides of the slidable piston 93, the doll is then ready for removal from the mold. This is accomplished utilizing an extraction piston 105 which is affixed to the piston rod 79 and is located within the top chamber 77 of the air cylinder arrangement. Air or other gas is admitted to an inlet 107 disposed below the extract piston 105 which will tend to drive the piston 105 upwardly toward the top 81 of the air cylinder, pulling with it the affixed piston rod 79 and the clamp 85 affixed to the bottom end thereof. This pulls the formed foamed body out of the mold and into the chamber 75 of the air cylinder. The chamber 77 additionally has an inlet 109 disposed on the opposite side of the slidable extract piston 105 from inlet 107. Inlet 109 can serve the function of driving the piston 105 downwardly with air if gas is exhausted from inlet 107, and cause the clamp 85 to be moved downwardly pushing the extracted body out of the mold and returning the clamp to the position for receiving the next item to be withdrawn.

Though a pneumatic system is shown with regard to chamber 77 at the top of the air cylinder for effecting removal of the doll through the use of an extract piston 105, it should be obvious that this can be eliminated. In its place a mechanical system whereby means is connected to the tubular piston rod 79 at the top of the air cylinder which can pull it upwardly out of chamber 75 to lift the formed body.

We claim:

1. A device for withdrawing a foamed plastic body from an associated mold having an opening therein, comprising:
   a pressure vessel open at one end thereof and having means at said open end for releasably sealingly engaging said mold around said opening therein;
   a slidable piston disposed within said vessel for sliding movement toward and from said open end,
   a clamp means disposed in said vessel, extending between said piston and said open end, said vessel being hollow from said clamp to said open end, whereby said clamp means can clamp a portion of a foamed plastic body at said mold opening,
   means for securing said clamp means to said piston,
   and means for admitting gas to said vessel between said piston and said open end.

2. The device of claim 1 further comprising:
   a hollow piston rod connected to said piston,
   said piston having an aperture therethrough communicating with said hollow piston rod.

3. The device of claim 2 wherein said piston rod is integrally formed with said piston,
   and wherein said clamp means is affixed to said piston.

4. The device of claim 2 wherein:
   said piston is slidably mounted on said piston rod,
   said clamp means is affixed to said piston rod adjacent an end thereof,
   and said piston is provided with means for engaging said clamp means whereby when said piston rod and clamp means are moved in said vessel away from said open end, said piston is forced to move therewith.

5. The device of claim 4 further comprising:
   a hollow tube extending through said vessel, said piston rod concentrically surrounding said tube and slidably mounted thereon.

6. The device of claim 5 wherein:
   the end of said vessel opposite said open end is enclosed, said piston rod and hollow tube sealably passing therethrough.

7. The device of claim 6 wherein:
   a second gas inlet is provided in said vessel between said piston and said enclosed end.

8. The device of claim 6 further comprising:
   means for controllably moving said piston rod within said vessel.

9. The device of claim 8 wherein said means for moving said piston rod comprises:
   an enclosed chamber disposed adjacent the closed end of said pressure vessel, wherein said piston rod and hollow tube extends therethrough,
   a second piston disposed in said chamber and affixed to said piston rod,
   and means for pneumatically driving said second piston, whereby said piston rod can be controllably moved in said pressure vessel.

* * * * *